(12) United States Patent
Boukallel et al.

(10) Patent No.: US 8,739,641 B2
(45) Date of Patent: Jun. 3, 2014

(54) RESONATING FORCE SENSOR SENSITIVE TO MICRO-FORCES

(75) Inventors: Mehdi Boukallel, Fontenay aux Roses (FR); Mathieu Grossard, Verrieres le Buisson (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 185 days.

(21) Appl. No.: 13/511,130

(22) PCT Filed: Nov. 22, 2010

(86) PCT No.: PCT/EP2010/067941
§ 371 (c)(1),
(2), (4) Date: Jul. 23, 2012

(87) PCT Pub. No.: WO2011/061334
PCT Pub. Date: May 26, 2011

(65) Prior Publication Data
US 2012/0279319 A1 Nov. 8, 2012

(30) Foreign Application Priority Data
Nov. 23, 2009 (FR) .................................... 09 58254

(51) Int. Cl.
*G01L 1/10* (2006.01)
*G01L 1/00* (2006.01)
*G01L 5/00* (2006.01)

(52) U.S. Cl.
USPC ...................... 73/862.59; 73/862.381; 73/862

(58) Field of Classification Search
USPC ................................ 73/862.59, 862.381, 862
See application file for complete search history.

(56) References Cited

U.S. PATENT DOCUMENTS

| | | | |
|---|---|---|---|
| 6,423,564 B1 * | 7/2002 | Hulsing et al. | 438/52 |
| 6,595,054 B2 * | 7/2003 | Paros et al. | 73/504.04 |
| 6,662,657 B2 * | 12/2003 | Hulsing et al. | 73/504.04 |
| 6,745,627 B1 * | 6/2004 | Woodruff et al. | 73/514.29 |
| 2002/0125791 A1 * | 9/2002 | Blake | 310/311 |
| 2002/0157477 A1 * | 10/2002 | Hanson | 73/788 |
| 2002/0166379 A1 * | 11/2002 | Paros et al. | 73/504.12 |
| 2003/0041668 A1 * | 3/2003 | Hulsing et al. | 73/504.12 |

OTHER PUBLICATIONS

International Search Report and Written Opinion in International Application No. PCT/EP2010/067941, mailed Feb. 4, 2011.

(Continued)

*Primary Examiner* — Lisa Caputo
*Assistant Examiner* — Jamel Williams
(74) *Attorney, Agent, or Firm* — Nixon Peabody LLP (57) ABSTRACT

A micro-force sensor comprising a one-piece plate including a first area defining a first recess, which must be held in position relative to a mounting, a second area connected to the first area defining the first recess and a second recess, a measuring beam across the first recess having a first end embedded in the first area and a second end connected to the second area, an excitation beam across the second recess having two ends embedded in the second area and being provided with at least one excitation element, a third area connected to the first area and an effector beam having one free end for receiving the force being measured and one end-embedded in the third area, and a fourth area connecting the embedded end of the effector beam to the second end of the measuring beam, which is provided with a measuring element.

16 Claims, 7 Drawing Sheets

(56) References Cited

OTHER PUBLICATIONS

Sun, Y. et al., "A MEMS Micro Force Sensor for Drosophila Flight Characterization," IEEE International Conference on Robotics and Biomimetics, 2005 pp. 505-510.

Duc, T.C. et al., "Lateral Nano-Newton Force-Sensing Piezoresistive Cantilever for Microparticle Handling," Journal of Micromechanics and Microengineering, vol. 16, 2006, pp. S102-S106.

Jaroslawski, S. et al., "Direct Visualization of KirBac3.1 Potassium Channel Gating by Atomic Force Microscopy," Journal of Molecular Biology, vol. 374, 2007, pp. 500-505.

Li, G. et al., "3-D Nanomanipulation Using Atomic Force Microscopy," Proceedings of the 2003 IEEE International Conference on Robotics and Automation, vol. 3, Sep. 14-19, 2003, pp. 3642-3647.

Cheshmehdoost, A. et al., "Design and Performance Characteristics of an Integrated High-Capacity DETF-Based Force Sensor," Sensors and Actuators A, vol. 52, 1996, pp. 99-102.

Hayashi, T. et al., "Evaluation of a Tuning Fork Type Force Transducer for Use as a Transfer Standard," Measurement, vol. 41, 2008, pp. 941-949.

Bahadur, I.B., "Design of a MEMS-Based Resonant Force Sensor for Compliant, Passive Microgripping," Proceedings of the IEEE International Conference on Mechatronics and Automation, Jul. 2005, pp. 77-82.

\* cited by examiner

RESONATING FORCE SENSOR SENSITIVE TO MICRO-FORCES

CROSS REFERENCE TO RELATED APPLICATIONS OR PRIORITY CLAIM

This application is a National Phase of PCT/EP2010/067941, filed Nov. 22, 2010, entitled, "RESONATING FORCE SENSOR SENSITIVE TO MICRO-FORCES", which claims the benefit of French Patent Application No. 09 58254, filed Nov. 23, 2009, the contents of which are incorporated herein by reference in their entirety.

TECHNICAL FIELD

The present invention relates to a resonating force sensor sensitive to micro-forces.

A force sensor is a device that combines both electronics and mechanics. It enables a force, in other words a vectorial physical quantity, to be converted into an electrical quantity. A resonating force sensor is intended to be made to vibrate at resonance when it is used.

The expression sensor sensitive to micro-forces is taken to mean a force sensor sensitive to values of forces ranging from ten or so micro Newtons to one or more milli Newtons.

PRIOR ART

A force sensor generally comprises a proof body, the dimensions of which have been chosen as a function of the forces to be measured and which is provided with measuring elements that are judiciously spread out over the proof body. The proof body is a mechanical element that reacts selectively to the force to be measured, also known as mesurand. It transforms the force to be measured into a physical quantity which is here a deformation.

The measuring elements are sensitive elements connected to the proof body, they are in this case deformation sensors. They express the reactions of the proof body in an electrical quantity constituting the output signal.

In the prior art, sensors suited to measuring forces comprised in the range cited below have very compact proof bodies and very low rigidity because the force and the rigidity are correlated quantities.

Two categories exist, either the proof body integrates the measuring elements, or the proof body is associated with an exterior instrumentation.

In the first category, capacitive or piezoresistive deformation sensors are generally used as measuring elements. The document referenced [1] at the end of the description illustrates a force sensor based on an electrostatic principle. For the piezoresistive approach, reference may be made to the document [2], the complete references of which are given at the end of the description. This document [2] shows a proof body with a base connected to a cantilevered beam, provided with piezoresistive gauges, at least one of which is located at the level of the embedding between the beam and the base.

In the second category, generally an instrumentation without contact is used with the proof body to determine its deformation. The instrumentation is generally based on interferometry, telemetry, or capacitive measurement. An example of this type of force sensor is given by the atomic force microscope illustrated for example in the documents [3] and [4], the complete references of which are given at the end of the description. A tip is borne by a relatively flexible and reflective lever, it is anchored on a proof body. The tip is brought into contact with the object to be analyzed or made to oscillate near to the object to be analysed. A laser beam of low power is reflected on the lever. If the laser beam deviates, it is that the lever has inflected (in one direction or in the other), the deviation is thus indicative of the interaction forces between the tip and the surface of the object to be analysed. The measurement of the deviation of the tip thus passes by that of the position of the reflected laser beam, which takes place by means of a photoreceptor, for example a quadrant of photodiodes.

The disadvantage of second category sensors is that they are bulky and that they can only be used in certain applications where size has no importance. Conversely, the measures may be performed with high precision.

The disadvantage of first category sensors is that it is very difficult to integrate the measuring elements on very small proof bodies even though only these very small proof bodies enable the smallest forces of the range given above to be measured.

Force sensors known as resonating sensors also exist, in other words intended to be excited to their vacuum resonance frequency. They use as measuring element piezoelectric sensors.

In these configurations, a proof body is made to vibrate at its resonance frequency by means of at least one piezoelectric actuator or an electrostatic actuator. When a force is applied to the proof body, the resonance frequency of the proof body changes. At least one measuring element connected to the proof body measures the variation in resonance frequency and this variation in frequency provides information on the gradient of the force applied. This type of resonating force sensor is known for its great measuring precision. Reference may be made for example to FIGS. 1A, 1B, 1C, which illustrate the principle of such a resonating force sensor.

Figures 1A, 1B, 1C:
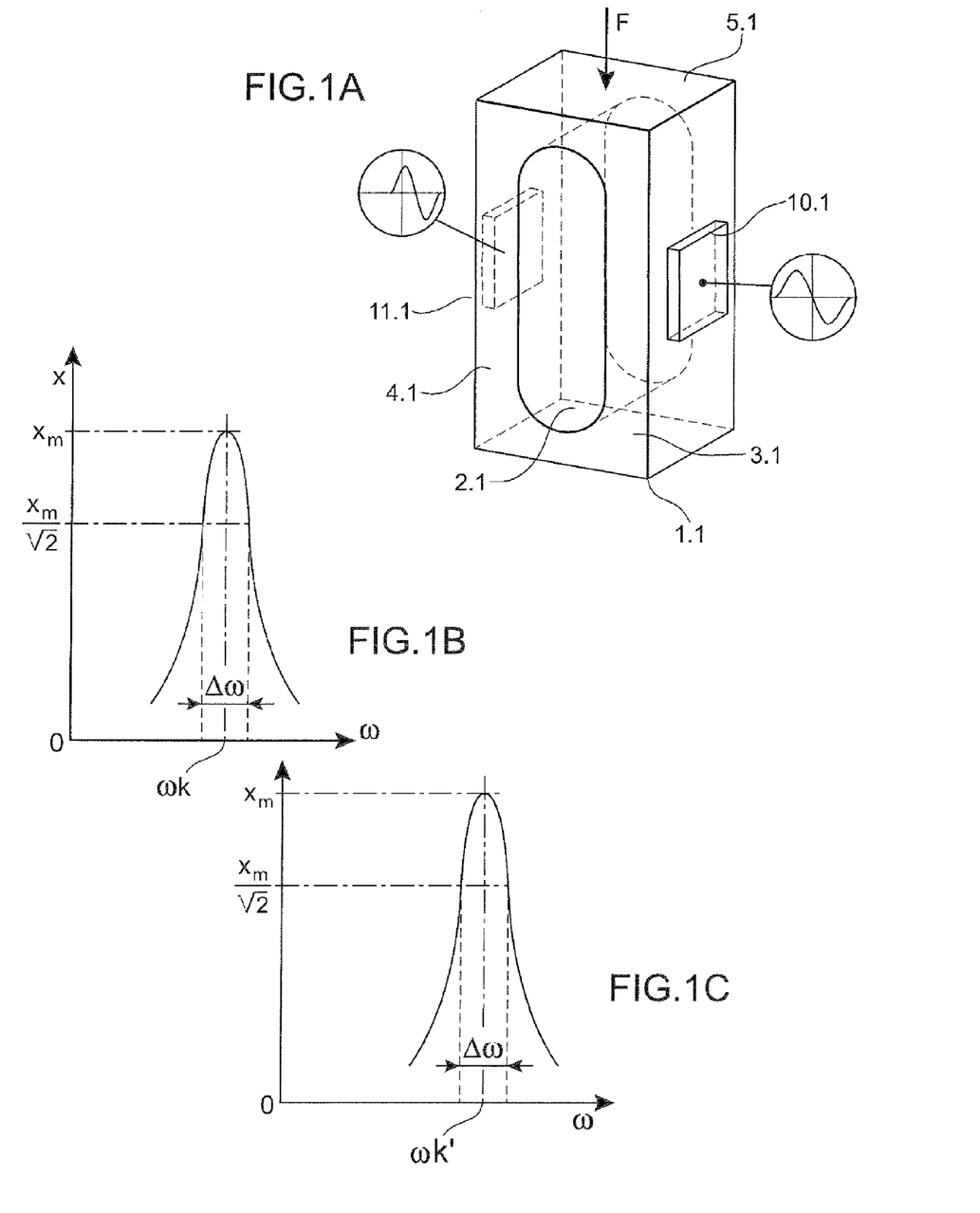
FIG. 1A shows a conventional force sensor not suitable for measuring micro-forces.
FIGS. 1B, 1C showing the deformation of the measuring beam as a function of the pulsation respectively in the absence and in the presence of a force applied to its effector area.

In FIG. 1A is schematised an example of proof body 1.1, in the form of parallelepiped provided with a recess 2.1 delimited laterally by two parallel beams 3.1, 4.1. The proof body 1.1 is one-piece. The two beams 3.1, 4.1 have their two embedded ends in the proof body 1.1. This type of proof body is known as double fork. The force to be measured F is applied to an effector area 5.1, which is one of the faces of the proof body 1.1. The beams 3.1, 4.1 are stressed in compression or in traction. An excitation element 10.1 is fixed to one of the beams 3.1 to make the proof body 1.1 vibrate. A measuring element 11.1 is fixed to the other beam 4.1. FIG. 1B shows the appearance of the deformation of the beam 4.1 at the level of the measuring element 11.1, as a function of the excitation pulse w that appears during the activation of the excitation element 10.1 in the absence of the force F. The resonance pulsation is $\omega k$. FIG. 1C shows the appearance of the deformation of the beam 4.1 at the level of the measuring element 11.1 as a function of the excitation pulse w of the proof body 1.1 in the presence of the force F. The resonance pulsation has changed and has become $\omega k'$. The two curves are shifted by $\Delta \omega k$. The two documents [5],[6], the references of which are given at the end of the description, describe force sensors of this DETF (i.e. double ended tuning fork) type. The sensor disclosed in the document [5] is quantified for quantities of forces of the order of 20 kN. The proof body has a length of the order of one hundred or so millimeters, a width of the order of several ten or so millimeters and a thickness of the order of ten or so millimeters. These forces are thus not micro-forces.

The force sensor described in the document [6] is more compact, it is quantified for force quantities of the order of 500 N. One is still not in the range of forces required.

These force sensors are one-piece. The vibratory approach means that all of the proof body vibrates. When it involves measuring forces of large amplitude, the effector area may be relatively massive and is not affected or practically not affected by the vibrations.

When it is desired to measure much smaller forces, in the range extending from ten or so micro Newtons to one or more milli Newtons, the proof body must be much less important, since the rigidity of the proof body depends on the geometry and the force depends on the rigidity. But with much smaller dimensions, the oscillations are going to affect the effector area and the measures risk being so noisy that they will not be exploitable. The document [7], the references of which are given at the end of the description, assesses the problems posed by this type of force sensor and evokes this problem of reduction of the vibration from the actuator up to the effector area.

In addition, the proof bodies described in these two documents have a given fixed rigidity, which means that depending on the nature of the measurements to be performed, the proof body may have to be changed and therefore it is necessary to have available a set of proof bodies.

DESCRIPTION OF THE INVENTION

The aim of the present invention is precisely to propose a resonating force sensor having a proof body, able to measure with precision micro-forces as defined previously, without being hindered by the vibrations linked to the resonance to which is subjected its proof body.

Another aim of the invention is to provide a force sensor sensitive to forces that apply in a two dimensional space which are those of its flat proof body.

Yet another aim of the invention is to provide a force sensor, the proof body of which has an adjustable rigidity, which avoids providing for a given force sensor several proof bodies having different rigidities.

An additional aim of the invention is to provide a force sensor provided with an electronic processing and command circuit that makes it possible to render the sensor robust with respect to potentially perturbing environmental conditions.

To attain these aims, the invention more precisely relates to a force sensor in which the force to be measured is applied to an embedded-free effector beam, the free end of which is located substantially on a vibration node when the proof body is made to vibrate.

More precisely, the present invention relates to a resonating force sensor comprising a proof body formed of a one-piece plate comprising a first area defining a first recess and intended, in operation, to be held in position with respect to a mounting, a second area defining both the first recess and a second recess, the second area being connected to the first area. A measuring beam extends across the first recess, having a first end embedded in the first area and a second end mechanically connected to the second area. An excitation beam extends across the second recess, having its two embedded ends in the second area, it is equipped with at least one excitation element. A third area is connected to the first area and an effector beam has a free end on which the force to be measured is going to be applied and an end embedded in the third area. Finally, a fourth area connects the embedded end of the effector beam to the second end of the measuring beam. Thus, when the proof body vibrates through activation of the excitation element, in the absence of force applied to the free end of the effector beam, the measuring beam has at least one vibration antinode and is equipped with at least one measuring element at the level of said antinode and the free end of the effector beam is situated substantially on a vibration node of the effector beam. Without activation of the excitation element, in the presence of a force applied to the free end of the effector beam, the measuring element is situated at a point of maximal deformation of the measuring beam.

It is preferable that the first area, the second area and the third area of the plate are solid so that the vibrations due to the excitation do not perturb the end of the effector beam.

In the same aim, it is preferable that the second area and the third area are each connected to the first area by a mechanical connection having an embedded behaviour when the first area is held in position with respect to the mounting.

To absorb the vibrations due to the excitation in order that they do not propagate up to the free end of the effector beam, it is preferable that the mechanical connection between the second end of the measuring beam and the second area is a connection pivot.

So that the deformation of the effector beam under load indeed propagates up to the measuring beam, it is preferable that the fourth area is less massive than the first, the second and the third areas.

This fourth area may be formed of a succession of beams connected to each other, of which a first extreme beam is connected to the embedded end of the effector beam and a second extreme beam is connected to the second end of the measuring beam.

To stiffen the proof body without increasing in a significant manner its mass, it is preferable that the succession comprises an intermediate beam between the two extreme beams, an end of the intermediate beam being connected to an end of the end beam by a first additional beam and the other end of the intermediate beam being connected to the second area through the intermediary of a second additional beam.

It is advantageous in particular from the point of view of mechanical rigidity and thus metrological performances that the plate is made of metal such as aluminium.

Preferably the plate is given a thickness of the order of a millimeter, a greater length and a greater width of the order of twenty or so millimeters.

To reduce the supply voltage required to make the proof body vibrate, it is preferable to provide the excitation beam with two excitation elements facing each other on opposite faces of the excitation beam.

The force sensor according to the invention moreover comprises an electronic command and processing circuit intended to receive a signal delivered by the measuring element, to supply a signal to the excitation element and having an output intended to supply a signal expressing the amplitude of the force applied to the free end of the effector beam and its direction. It is preferable that it comprises, so as to have the aforementioned robustness properties, an automatic control loop to adjust the signal supplied to the excitation element in order that it has a frequency automatically controlled as a function of the difference between the phase of the signal delivered by the measuring element and the phase of the signal supplied to the excitation element, whatever the force applied to the free end of the effector beam.

The automatic control loop may comprise a multiplier unit having an input receiving the signal delivered by the measuring element having optionally undergone a phase shifting and another input receiving a signal expressing the signal to apply to the excitation element, and an output connected to an input of a low pass filter unit, the low pass filter unit having an output which is on the one hand the output intended to supply a signal expressing the intensity of the force applied to the free end of the effector beam, and which on the other hand is connected to an input of a voltage controlled oscillator unit, the voltage controlled oscillator unit having one output connected on the one hand to the second input of the multiplier unit and on the other and to the excitation element.

It may comprise moreover an amplifier unit to supply a signal of level appropriate to the multiplier unit, the output of the voltage controlled oscillator unit being connected to an input of the amplifier unit, the amplifier unit having an output connected to the second input of the multiplier unit and on the other hand to the excitation element.

The electronic command and processing circuit moreover comprises a voltage divider unit, said voltage divider unit having an input connected to the output of the amplifier unit, and an output connected to the excitation element so as to reduce the level of the signal to apply to the excitation element to a required level, less than that supplied by the amplifier unit.

The electronic command and processing circuit comprises, moreover, a phase shifter unit making it possible to adjust the rigidity of the proof body without having to change the proof body, said phase shifter unit having an output connected to the first input of the multiplier unit and an input connected to the measuring element.

It is preferable to provide, moreover, in the electronic command and processing circuit, an impedance adaptation unit having an input connected to the measuring element and an output connected to the input of the phase shifter unit.

BRIEF DESCRIPTION OF DRAWINGS

The present invention will be better understood on reading the description of embodiment examples given purely by way of illustration and in no way limiting, while referring to the appended drawings, in which.

Identical, similar or equivalent parts of the different figures described hereafter bear the same numerical references so as to make it easier to go from one figure to the next.

The different parts in the figures are not necessarily represented at a uniform scale in order to make the figures more legible.

DETAILED DESCRIPTION OF PARTICULAR EMBODIMENTS

Figure 2:
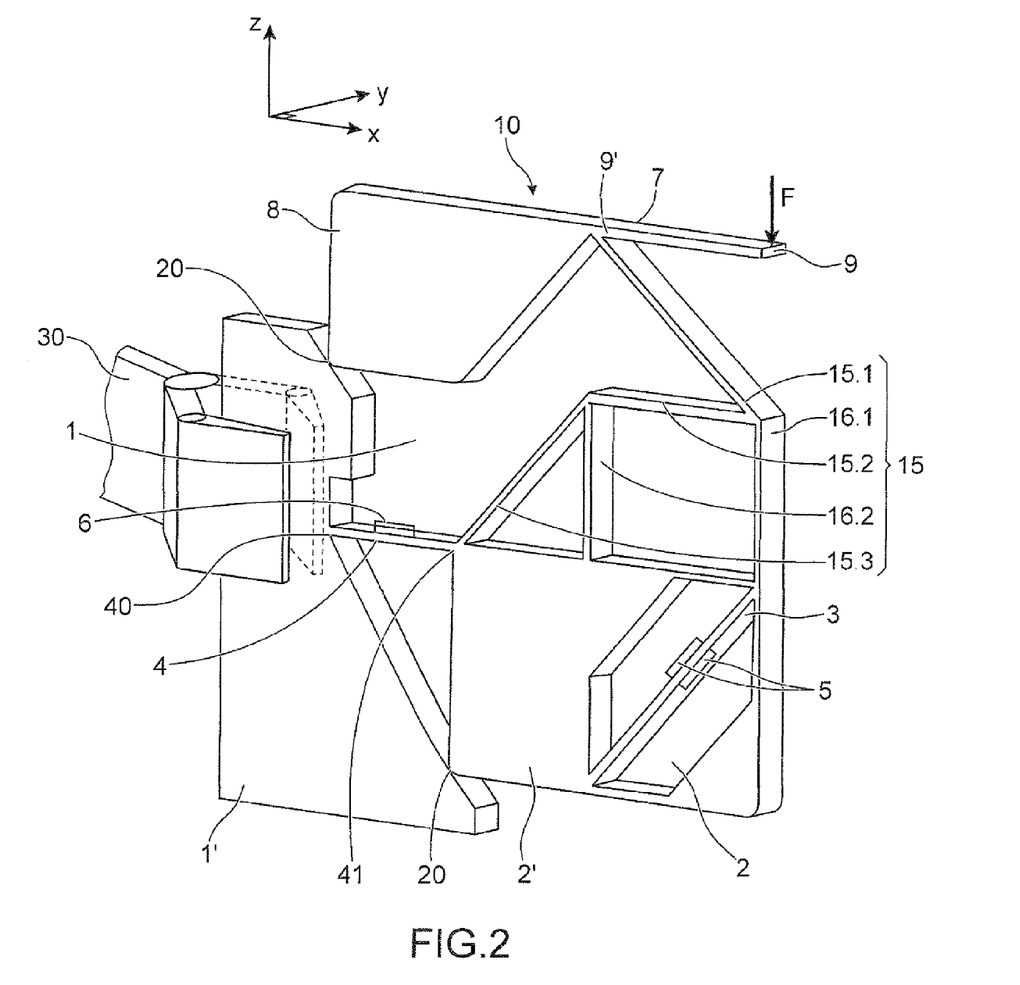
FIG. 2 is a frontal view of the proof body of an example of force sensor according to the invention.

Reference will be made to FIG. 2, which shows in frontal view an example of a resonating force sensor according to the invention. It comprises a one-piece proof body 10. The proof body 10 is formed from a metal plate, for example made of T6 type aluminium, in other words aluminium heat treated to be hardened by solution heat treatment, quenched and tempered.

The starting plate is for example a square with 20 millimeters sides, its thickness being 1 millimeter. It has at least two recesses 1, 2. A beam 3, 4 projects across each of them, it connects two opposite edges of the recess in which it lies.

The plate thus comprises at least one first area 1' defining the first recess 1, a second area 2' defining both the first recess 1 and the second recess 2, the second area 2' being connected to the first area 1'. The first area 1' is intended to be held in position with respect to a mounting 30 during the measurement. The mounting 30 may take the shape of a vice (schematised in FIG. 2), the jaws of which would grip the two main faces of the metal plate at the level of the first area 1'.

One of the beams is known as excitation beam (reference 3) and the other measurement beam (reference 4).

The excitation beam 3 may have a section of 1 millimeter by 280 micrometers and a length of 7 millimeters and the measuring beam 4 may have a section of 1 millimeter by 310 micrometers and a length of 6 millimeters.

The measuring beam 4 comprises a first end 40 embedded at the level of the first area 1' and a second end 41 mechanically connected to the second area 2'. The mechanical connection between the second end 41 of the measuring beam 4 and the second area 2' is a connection pivot when the first area 1' of the proof body is held in position with respect to the mounting 30. Connection pivot is taken to mean a connection that allows a rotational movement between the second end 41 of the measuring beam 4 and the second area 2'.

The excitation beam 3 is equipped with at least one excitation element 5, for example made of piezoelectric material, such as PZT (lead zirconate titanate). The excitation element 5 and the excitation beam 3 with which it is provided are intended to make the proof body 10 vibrate so as to make it resonate.

For an efficient excitation and a low electrical supply, it is preferable to place two excitation elements 5 on two opposite faces of the excitation beam 3 and opposite each other. In FIG. 2, the excitation elements 5 are on the widest lateral faces of the excitation beam 3. Obviously they could be placed on the least wide lateral faces of the excitation beam 3, but for a same excitation element, the energy consumption would be higher to obtain a same deformation of the excitation beam 3.

The measuring beam 4 is equipped with at least one measuring element 6 for example made of piezoelectric material, such as PZT (lead zirconate titanate). Said measuring element 6 is intended to measure the deformation of the beam 4 on which it is mounted.

The measuring and excitation elements 6, 5 may take the form of pads and be bonded onto the beams 4, 3 with electrically conducting adhesive. Other embodiments are possible, they could be printed on the beam on which they are mounted. They may have a length of 12 millimeters, a thickness of 0.2 millimeters and a width of a millimeter.

The plate moreover comprises an effector beam 7 that projects from a third area 8 of the plate. This effector beam 7 has a free end 9 and thus another embedded end 9' in the third area 8. In the example described, the effector beam may have a section of 1 millimeter by 200 micrometers and a length of 7 millimeters. The free end 9 of the effector beam is intended to receive the force to be measured F. This force F aims to deform it in flexion, in extension or in compression. It may be directed transversally, along the z axis, or instead along a main axis of the effector beam, in other words along the x axis, which comes down to saying that the direction x and the direction z form a plane xoz which is that of the plate. The third area 8 is connected to the first area 1' by a mechanical connection 20 having an embedded behaviour when the first area 1' is held in position with respect to the mounting 30.

Theoretically, when the proof body is made to resonate, the displacement at the level of an embedding is zero. But since the embedding may not be perfect, the mechanical connection can move in the plane xoz.

The plate moreover comprises a fourth area 15 that connects the embedded end 9' of the effector beam 7 to the second end 41 of the measuring beam 4 optionally via the second area 2'. It is less massive than the first, second and third areas. The fourth area 15 may comprise at least one beam 15.1 which extends from the embedded end 9' of the effector beam 7 to the second area 2'. So as not to weigh down the proof body 10, the fourth area 15 may be formed of a succession of beams 15.1, 15.2, 15.3 cut out in the plate, connected to each other, a first extreme 15.1 of which is connected to the embedded end 9' of the effector beam 7 and a second extreme 15.3 is connected to the second end 41 of the measuring beam 4, in other words to the connection pivot. A rotation is thus authorised between the second end 41 of the measuring beam 4 and the second extreme beam 15.3.

To stiffen the proof body without increasing in a significant manner its mass, it is preferable that the succession of beams 15.1, 15.2, 15.3 comprises an intermediate beam 15.2 between the two extreme beams 15.1, 15.3, an end of the intermediate beam 15.2 being connected to an end of the excitation beam 3 by a first additional beam 16.1 and the other end of the intermediate beam 15.2 being connected to the second area 2' through the intermediary of a second additional beam 16.2. All of these beams are machined in the plate since it is one-piece. The additional beams 16.1, 16.2, just like the succession of beams 15.1, 15.2, 15.3, form part of the fourth area 15, the set of beams of the fourth area 15 form a trellis. Thus, the first extreme beam 15.1 makes it possible to join the effector beam 7 through the intermediary of its embedded end 9' to the excitation beam 3 and to the measuring beam 4. This layout means that as soon as a force is applied to the free end 9 of the effector beam 7 along the x axis or the z axis, the resulting deformation is felt on the measuring beam 4.

Thus, when the proof body 10 vibrates through activation of the excitation element 5, in the absence of force applied to the free end 9 of the effector beam 7, the measuring beam 4 has at least one vibration antinode at the level of which is found the measuring element 6. The free end 9 of the effector beam 7 is situated substantially on a vibration node of the effector beam 7. Without activation of the excitation element 5, in the presence of a force F applied to the free end 9 of the effector beam 7 along the x axis or the z axis, the measuring element 6 is situated on an area of maximal deformation of the measuring beam 4.

When the proof body 10, not stressed at the level of the effector beam 7, is made to vibrate by means of the excitation element 5 at a frequency for which the phenomenon of resonance is observed, the frequency is a resonance frequency also known as natural frequency of the proof body 10. There are several natural frequencies, the smallest is known as fundamental frequency f1 and the others are multiples of the fundamental frequency, they are equal to j.f1 with j a whole number greater than one. When the proof body 10 is excited at the level of the excitation beam 3 to a frequency fj, the measuring beam 4 vibrates and exhibits j vibration antinodes and j+1 vibration nodes. A measuring element 6 is thus placed at the level of a vibration antinode of the measuring beam 4.

When the proof body 10 is made to vibrate at one of its resonance frequencies by means of the excitation element 5, without a force being applied to the effector beam 7, the excitation beam 3 is subjected to successions of stretchings and compressions. A periodic signal (generally sinusoidal) is delivered by the measuring element 6, it is phase shifted by $\pi/2$ with respect to the signal applied to the excitation beam 3 by the excitation element 5. When a force is moreover applied to the free end 9 of the effector beam 7, directed along the x axis or along the z axis, the deformation brought about by this force applied at the level of the free end 9 of the effector beam 7 propagates in the proof body 10 up to the measuring beam 4, which on the one hand modifies the rigidity of the proof body and on the other hand brings about a displacement of the resonance frequency at the level of the measuring beam 4.

In the example described, the structure of the proof body 10 means that the vibration generated by the excitation of the excitation beam 3 propagates through the second area 2' up to the measuring beam 4. The second area 2' is also connected to the first area 1' by a mechanical connection 20 having an embedded behaviour when the first area 1' is held in position with respect to the mounting 30. Thus, the first area 1' of the plate then lies between the second area 2' and the third area 8 of the plate, these areas being connected together by mechanical connections 20 having embedded behaviours.

On the other hand, on account of the fourth trellis of beams area 15, there is not in the proof body 10 a solid and massive area connecting directly one of the ends or the other of the excitation beam 3 and the embedded end 9' of the effector beam 7.

The areas 1', 2', 8 are solid and of greater surface area than the fourth area 15, they are thus much more massive than the fourth area 15. The deformation of the effector beam 7 during the application of a force may thus be transmitted by amplifying itself at the measuring beam 4 via the third area 8 and the first area 1'. Thus, low stresses in terms of constraints applied to the free end 9 of the effector beam 7 result in a maximal deformation of the measuring beam 4.

The presence of the connection pivot at the second end 41 of the measuring beam 4 means that a part of the vibrations generated by the excitation beam 3 propagate in the second area 2' and are absorbed, which prevents their propagation up to the free end 9 of the effector beam 7.

On the other hand, the fourth trellis of beams area 15 also makes it possible that the deformation of the effector beam 7 appearing during the application on its free end 9 attains the measuring beam 4.

Since the plate is one-piece and the beams belong to the plate, the beams, their embeddings and the recesses are obtained by conventional methods of machining the plate.

In order to be able to acquire in an efficient and precise manner the force to be measured applying on the free end 9 of the effector beam 7, an electronic command and processing circuit 100 is used connected on one side to the excitation element 5 to command the excitation of the excitation beam 3 and on the other to the measuring element 6, said electronic circuit 100 having an automatic control loop making it possible to conserve a phase shifting of $\pi/2$ between the signal applied to the excitation element 5 and the signal delivered by the measuring element 6 in the presence of the force to be measured and whatever the quantity of the force to be measured and even if the measuring beam vibrates at a frequency close to the resonance frequency of the proof body. These signals are periodic and generally sinusoidal.

The automatic control acts on the frequencies. The frequency fe of the signal delivered by the measuring element 6, when no force is applied to the free end 9 of the effector beam 7, is substantially the same as that of the signal applied to the excitation element 5 and referenced fs. On the other hand, the phase $\phi e$ of the signal delivered by the measuring element 6 is phase shifted by $\pi/2$ with respect to the phase $\phi s$ of the signal applied to the excitation element. When a force is applied to the free end of the effector beam 7, the frequency fe of the signal delivered by the measuring element 6 is modified as well as its phase φe. The automatic control loop of the electronic command and processing circuit 100 corrects the frequency fs of the signal applied to the excitation element 5 to recover at the level of the measuring element 6, a new resonance or quasi resonance frequency and a phase shifting of π/2 with respect to the phase of the signal applied to the excitation element 5 in the presence of the force applied to the free end 9' of the effector beam 7. Thus, thanks to the automatic control, the signal applied to the excitation element 5 has a frequency automatically controlled as a function of the difference between the phase φe of the signal delivered by the measuring element 6 and the phase φs of the signal supplied to the excitation element 5.

The phase difference due to the correction expresses the gradient of the force to be measured. Its sign expresses its direction.

Figure 3:
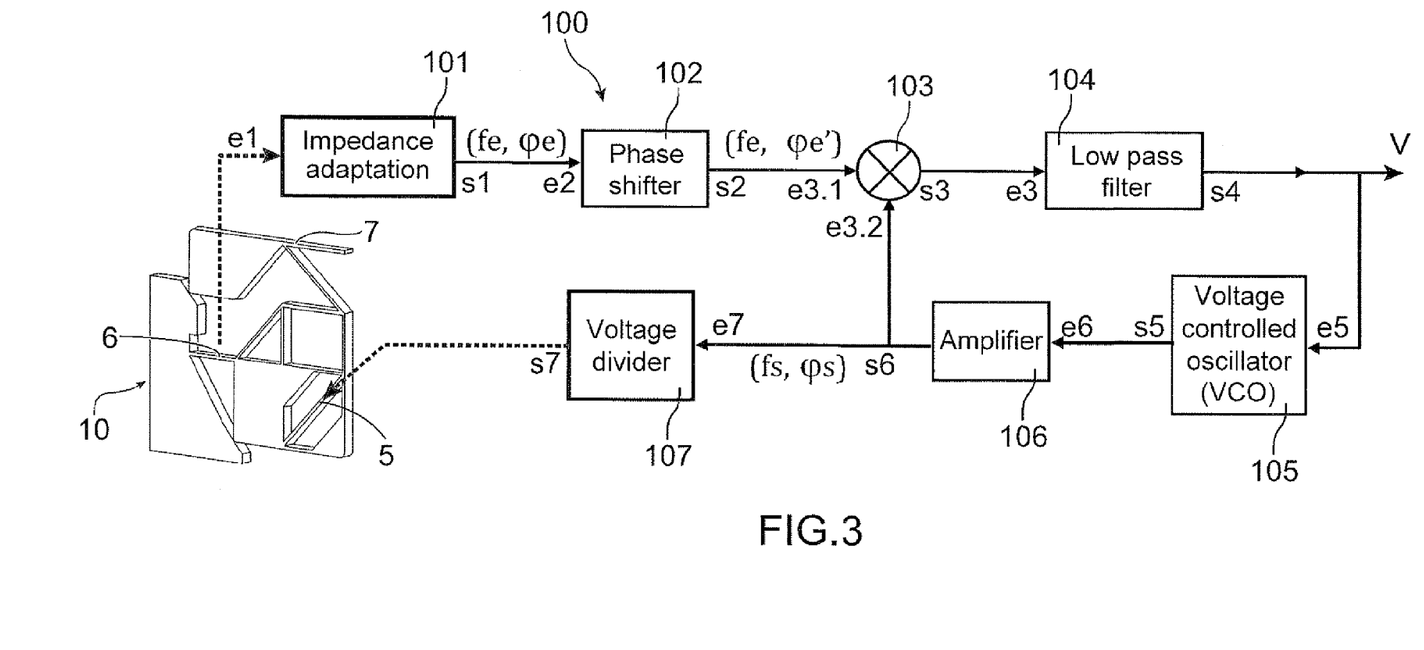
FIG. 3 is a diagram in the form of units of the electronic command and processing circuit of the sensor according to the invention.

In FIG. 3 is represented, in the form of units, the different elements of the electronic circuit 100. The electronic circuit 100 guarantees a stable and reliable operation over the lifetime of the sensor while being practically insensitive to variable environmental conditions. It will be recalled that piezoelectric elements are for their part sensitive to temperature variations.

The measuring element 6 is connected to an input e1 of an impedance adaptation unit 101. Said impedance adaptation unit 101 has the function of adapting the impedance between the measuring element 6 and the unit that is downstream thereof and which is a phase shifter unit 102. The impedance of a measuring element 6 of piezoelectric type is very high and equal to several Mega Ohms from which follows the use of the impedance adaptation.

The output s1 of the impedance adaptation unit 101 is connected at the input e2 to the phase shifter unit 102, said phase shifter unit 102 having the function of performing a temporal phase shifting between the signal applied to its input and the signal that it delivers. The phase of the signal that it receives is φe and the phase of the signal that it delivers is φe' and the difference between the two phases Δφ=φe−φe' expresses the gradient of the force to be measured. This phase difference is obtained downstream of the phase shifter unit 102 at the level of a multiplier unit 103 described hereafter.

This phase shifting function makes it possible to carry out the necessary adjustments during the calibration and to make an additional correction in the phase shifting which will lead to an adjustment of the rigidity of the proof body 10. This adjustment is carried out by an operator who acts on the potentiometer PT variable resistor connected and illustrated in FIG. 4B.

The phase shifter unit 102 has its output s2 connected to a first input e3.1 of the multiplier unit 103. The multiplier unit 103 makes it possible to multiply the signal applied to its first input e3.1 to that applied to a second input e3.2, it delivers at its output s3 a signal which is still periodic. The multiplier unit 103 thus receives on the one hand on its first input e3.1 the signal delivered by the phase shifter unit 102 and on its second input e3.2 a signal delivered by an amplifier unit 106 that will be presented hereafter. The multiplier unit 103 has its output s3 connected in input e4 to a low pass filter unit 104 which makes it possible to limit the spectrum of the signal that it receives to a range of frequencies comprised between 0 and its cut-off frequency. The low pass filter unit 104 delivers at the output s4 a direct voltage signal V, the amplitude of which expresses the phase shifting Δφ brought about by the phase shifter unit 102 and which is the image of the intensity of the force applied to the free end of the effector beam 7. The sign of this voltage signal expresses the direction of the force applied to the free end of the effector beam.

The low pass filter unit 104 has its output s4 also connected at the input e5 to a voltage controlled oscillator unit 105, the role of which is to supply a periodic signal, the frequency fs of which is proportional to the voltage applied to its input and thus to the phase shifting Δφ and the phase of which is φs. The signal to apply to the excitation element 5 will have this phase φs. The output s5 of the voltage controlled oscillator unit 105 is connected at the input e6 to an amplifier unit 106 which performs the amplification of the signal present at its input e6 by a determined factor.

The output s6 of the amplifier unit 106 is connected on the one hand to the second input e3.2 of the multiplier unit 103, which closes the automatic control loop and on the other hand to an input e7 of a divider bridge unit 107. The divider bridge unit 107 makes it possible to reduce the amplitude of the periodic signal present at its input e7 by a predetermined factor. This amplitude is determined by the values of the components, generally of resistor type, which compose this divider bridge unit 107. The phase of this signal is φs and its frequency fs.

The divider bridge unit 107 has an output s7 connected to the excitation element 5 situated on the excitation beam.

When Δφ is zero, the frequencies fe and fs are equal, this is no longer the case as soon as Δφ is non zero, in other words that the frequencies fe and fs are different and that a force applied to the end of the effector beam is measured.

Thanks to this automatic control loop, it is possible to guarantee an operation of the force sensor around a desired frequency and whatever the force applied to the effector beam and whatever the environmental conditions, in other words whatever the variations in temperature, pressure, inclination, acceleration, vibration, etc.

FIGS. 4A to 4G show conventional examples of electronic circuits suitable for each of the units of the electronic circuit 100. Details will not be given of these electronic circuits because they do not pose problems to those skilled in the art.

Figure 4A:
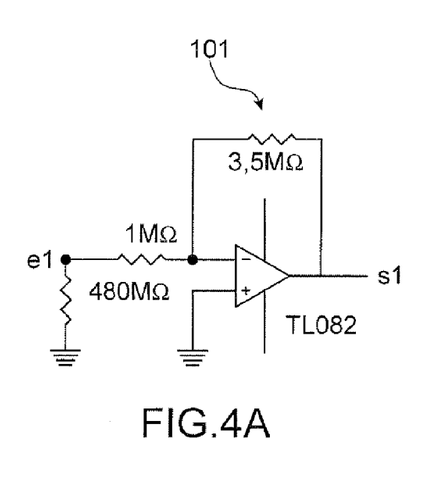
FIGS. 4A to 4G illustrate an example of circuit for each of the units of FIG. 3.
Figure 4B:
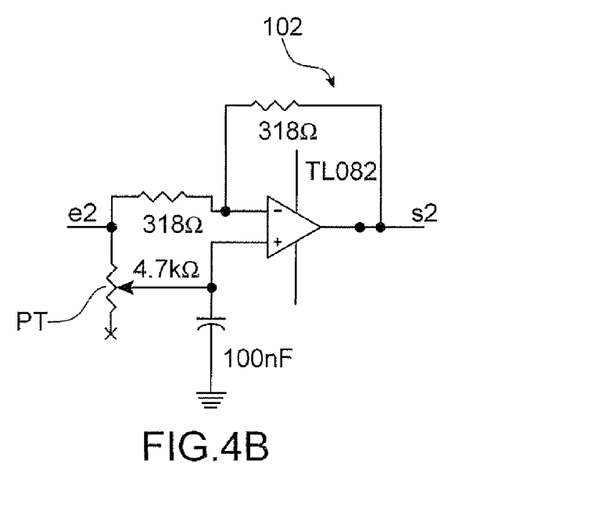
Figure 4C:
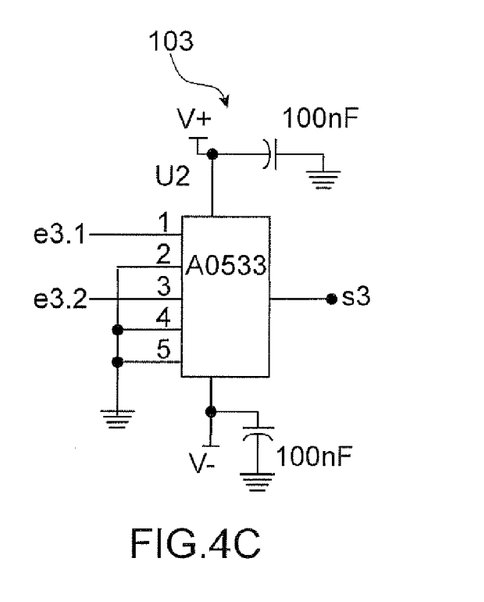
Figure 4D:
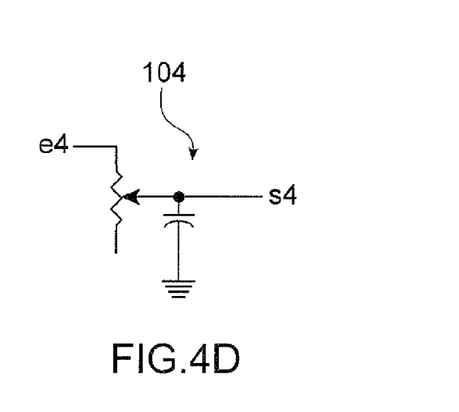
Figure 4E:
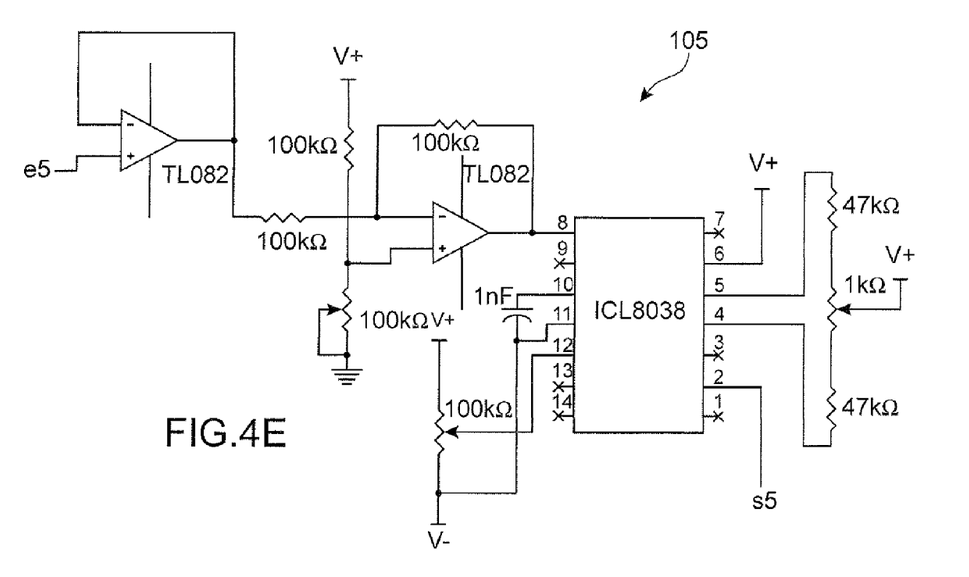
Figure 4F:
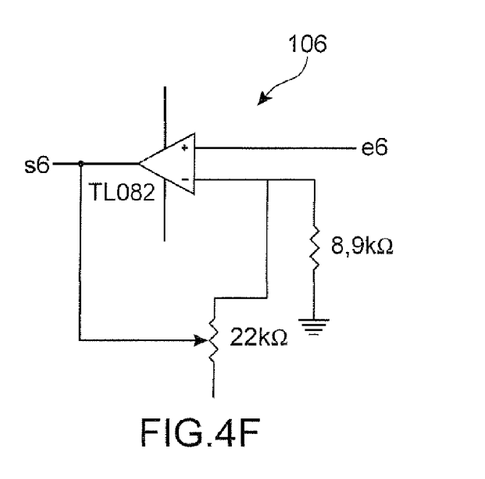
Figure 4G:
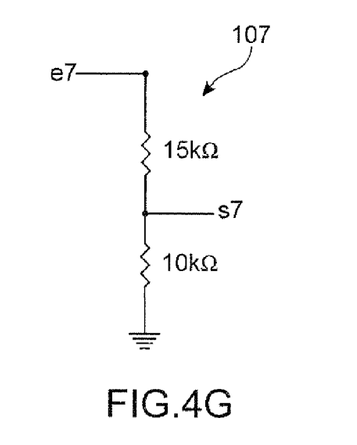

FIG. 4A gives details of the impedance adaptation unit, FIG. 4B gives details of the phase shifter unit, FIG. 4C gives details of the multiplier unit, FIG. 4D gives details of the low pass filter unit, FIG. 4E gives details of the voltage controlled oscillator unit, FIG. 4F gives details of the amplifier unit, FIG. 4G gives details of the voltage divider unit. In these figures, the passive components are marked by their values and the active components by their reference code.

Figure 5:
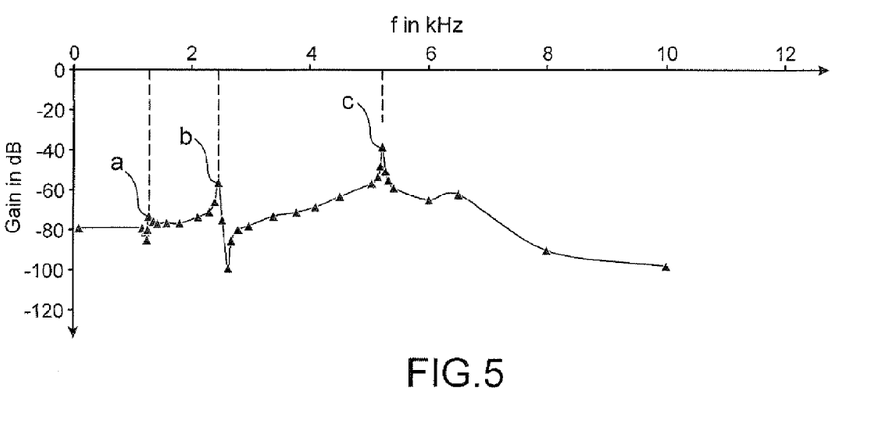
FIG. 5 is a graph which is the spectral response of the force sensor according to the invention.

FIG. 5 illustrates the spectral response of the force sensor according to the invention. On the abscissa are represented the frequency values of the signals delivered by the measuring element 6, which correspond to the vibration frequency of the measuring beam 4, and on the ordinate a dB gain, which is the ratio between the amplitude of the signal delivered by the measuring element 6 and the amplitude of the signal applied to the excitation element 5. In the experimental conditions that have led to the graph of FIG. 5, the amplitude of the voltage signal applied to the excitation element 5 is 0.1 V.

The choice of the operating frequency is important so that a maximal deformation of the measuring beam 4 is indeed obtained at the level of the measuring element 6 but also so that the vibrations generated by the excitation beam 3 spare the free end of the effector beam.

In the experimental conditions, three characteristic operating points have been defined referenced a, b and c and corresponding respectively to the frequencies of the signals delivered by the measuring element, namely: 1.5, 2.65 and 5.54

KHz. To each characteristic operating point corresponds a given sensitivity of the force sensor according to the invention.

In passing from one characteristic operating point to another, thus by changing the pulsation of the signal delivered by the measuring element 6, the rigidity of the force sensor is modified without having to change its proof body since the rigidity k is connected to the pulsation in the following manner $$\omega = \sqrt{\frac{k}{m}}$$

with m mass of the proof body. Very different rigidities may then be obtained.

Another manner of adjusting the rigidity of the proof body is to make the measuring beam 4 vibrate at a frequency which is no longer exactly a resonance frequency but which is very close to that corresponding to one of the operating points a, b or c. Obviously it is still considered that the force sensor is of resonating type. In this case, the new rigidity of the proof body is close to that obtained during operation at one of the characteristic points a, b or c. This adjustment is obtained by commanding the phase shifting brought about by the phase shifter unit 102, via the potentiometer PT, as described previously.

Figure 6:
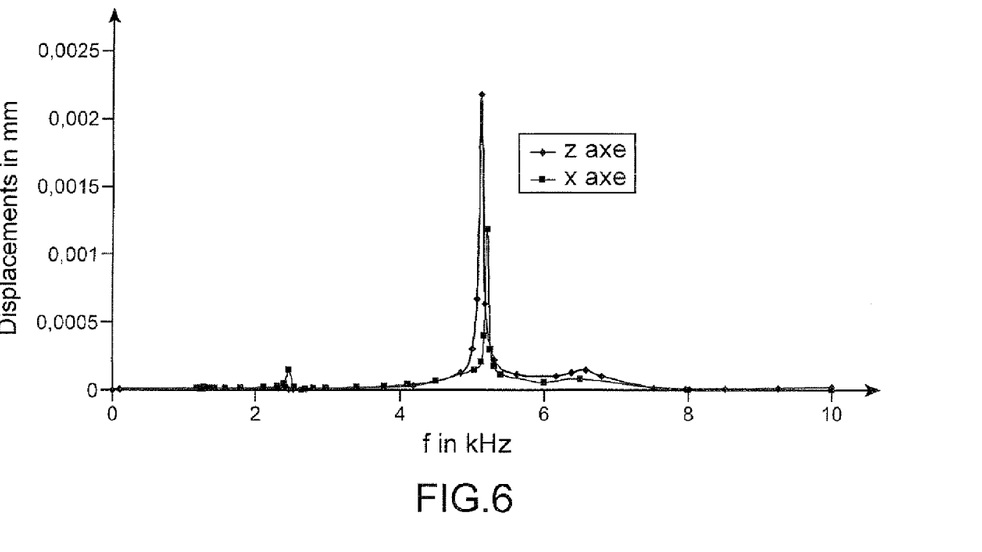
FIG. 6 illustrates the maximal oscillations measured for the characteristic operating points indicated in FIG. 5.

FIG. 6 illustrates the deflections obtained at the free end of the effector beam when a constant force is applied thereto either directed along its main axis, in other words along the x axis, or directed transversally to its main axis, in other words along the z axis, while the excitation frequency of the excitation element 5 is made to vary. The largest displacements, greater than 0.5 micrometers, are obtained for excitation frequencies close to the characteristic operating point c or for the excitation frequency of the characteristic operating point c.

Figure 7A:
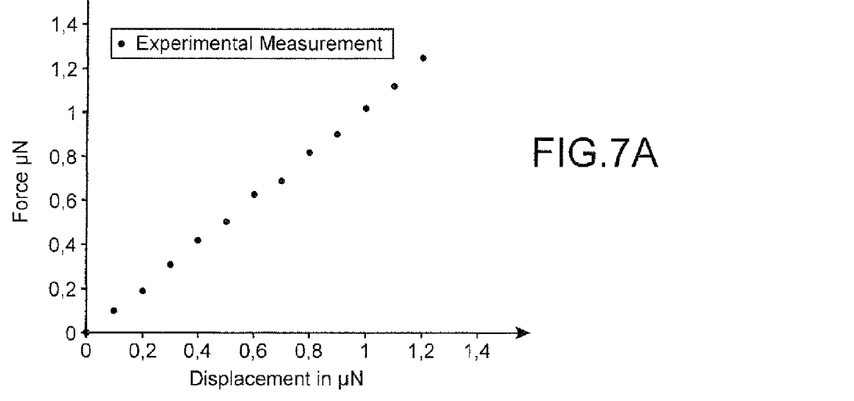
FIGS. 7A, 7B, 7C represent the relation between the force applied to the effector beam in the direction of its main axis and the displacement of said effector beam.
Figure 7B:
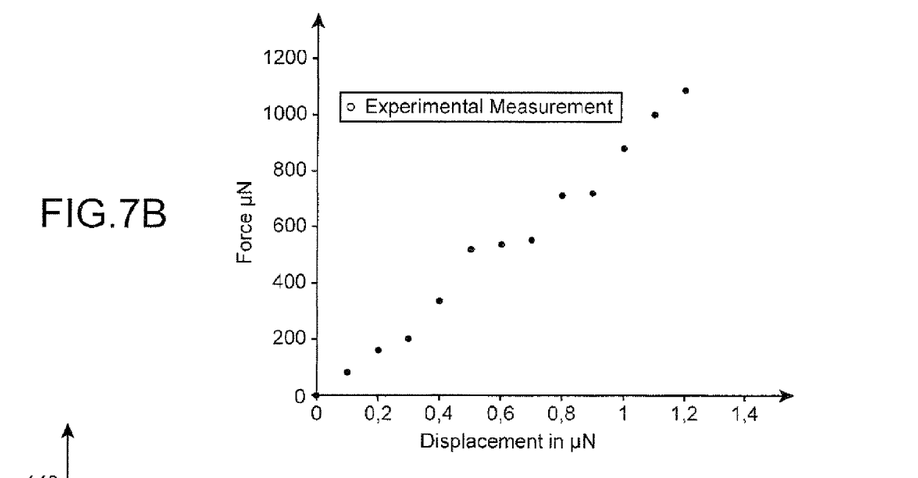
Figure 7C:
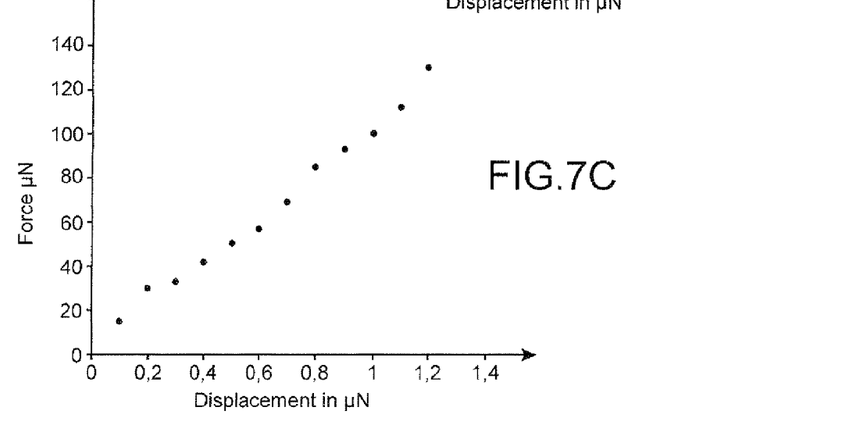

FIGS. 7A, 7B, 7C are graphs illustrating the displacement of the free end of the effector beam when a variable force directed along the x axis is applied thereto. FIG. 7A corresponds to the characteristic operating point c, FIG. 7B to the characteristic operating point b and FIG. 7C to the characteristic operating point a. In may clearly be seen that the characteristic operating point c gives the best sensitivity to the force sensor, since the displacements in a range extending from 0.1 and 1.2 micrometers correspond to forces extending from 0.1 to 1.2 micro Newtons, whereas for the operating point a the displacements in the same range are obtained with forces extending from 80 to 150 micro Newtons. This characteristic operating point a corresponds to the lowest sensitivity of the force sensor. This has the advantage of extending the measuring range.

A force sensor according to the invention may be used for the handling of objects, the dimensions of which are of the order of or less than a millimeter. In this application, the interaction between the effector beam and the object to be handled is crucial so as to enable a precise, repeatable and cyclical handling.

Another field of application is metrology and tribology. The force sensor may be integrated in particular in a near field microscope, a viscometer, a miniature accelerometer, an indenter. It will be recalled that an indenter is a device intended to control the penetration depth of a penetrator under the effect of a load. Such a device is used to determine the mechanical properties of materials, in particular the hardness and the Young's modulus.

Another field of application is the development of made to measure instrumentation for specific applications in physics, chemistry, biology, aerospace, for example.

It will be understood that different changes and modifications may be made, particularly to the proof body, without going beyond the scope of the invention. The space between the intermediate beam and the first area may be solid instead of being cut out. The same is true for the space between the second extreme beam and the first area. The effector beam, the excitation beam and the measuring beam can have any directions.

DOCUMENTS CITED

[1] "A MEMS micro force sensor for *drosophila* flight characterization" SUN and al., 2005 IEEE International conference on robotics and biomimetics, pages 505 to 510;

[2] "Lateral nano-Newton force-sensing piezoresistive cantilever for microparticle handling" T. Chu DUC et al., Journal of micromechanics and microengineering 16 (2006), pages 102 to 106;

[3] "Direct vizualization of KirBac3.1 potassium channel gating by atomic force microscopy" Szymon JAROLAWSKI et al., Journal of Molecular Biology, 2007, 374 (2), pages 500 to 505;

[4] "3D manipulation using atomic force microscopy" Guangyong LI et al., IEEE International conference on robotics and automation, 2003, Proceedings, ICRA'03, volume 3, 14-19 Sep. 2003, pages 3642 to 3647;

[5] "Design and performance characteristics of an integrated high-capacity DETF-based sensor" A. CHESHMEH-DOOST et al., Sensors and actuators A52 (1996) vol 5, pages 99 to 102;

[6] "Evaluation of a tuning fork type force transducer for use as a transfer standard" Toshyuki HAYASHI et al., Measurement 41 (2008), pages 941 to 949;

[7] "Design of a MEMS-based resonant force sensor for compliant, passive microgripping" Issam bait BAHADUR et al., IEEE International conference on mechatronics and automation, Niagara Falls, July 2005, pages 77 to 82.

The invention claimed is:

1. Resonating force sensor comprising a proof body formed of a one-piece plate including a first area defining a first recess, intended, in operation, to be held in position with respect to a mounting, characterised in that the plate comprises a second area defining both the first recess and a second recess, the second area being connected to the first area, a measuring beam extending across the first recess having a first end embedded in the first area and a second end mechanically connected to the second area, an excitation beam extending across the second recess having its two embedded ends in the second area being provided with at least one excitation element a third area connected to the first area and an effector beam having a free end on which the force to be measured is going to be applied and an end embedded in the third area, a fourth area connecting the embedded end of the effector beam to the second end of the measuring beam so that when the proof body vibrates through activation of the excitation element, in the absence of force applied to the free end of the effector beam, the measuring beam has at least one vibration antinode and is equipped with at least one measuring element at the level of said antinode, and the free end of the effector beam is situated substantially on a vibration node of the effector beam, and without activation of the excitation element, in the presence of a force applied to the free end of the effector beam, the measuring element is situated at a point of maximal deformation of the measuring beam.

2. Resonating force sensor according to claim 1, in which the first area, the second area and the third area are solid.

3. Resonating force sensor according to claim 1, in which the second area and the third area are each connected to the first area by a mechanical connection having an embedded behaviour when the first area is held in position with respect to the mounting.

4. Force sensor according to claim 1, in which the second end of the measuring beam is mechanically connected to the second area by a connection pivot.

5. Force sensor according to claim 1, in which the fourth area is less massive than the first, the second and the third areas.

6. Force sensor according to claim 5, in which the fourth area is formed of a succession of beams connected to each other, a first extreme of which is connected to the embedded end of the effector beam and a second extreme connected to the second end of the measuring beam.

7. Sensor according to claim 6, in which the succession comprises an intermediate beam between the two extreme beams, an end of the intermediate beam being connected to an end of the excitation beam by a first additional beam and the other end of the intermediate beam being connected to the second area through the intermediary of a second additional beam.

8. Force sensor according to claim 1, in which the plate is made of metal such as aluminium.

9. Force sensor according to claim 1, in which the plate has a thickness of the order of a millimeter, a greater length and a greater width of the order of twenty or so millimeters.

10. Force sensor according to claim 1, in which when the excitation beam is equipped with two excitation elements, they are situated opposite each other, on opposite faces of the excitation beam.

11. Force sensor according to claim 1, comprising moreover an electronic command and processing circuit intended to receive a signal delivered by the measuring element, to supply a signal to the excitation element and having an output intended to supply a signal expressing the intensity of the force applied to the free end of the effector beam, said electronic circuit comprising an automatic control loop to adjust the signal supplied to the excitation element so that it has a frequency automatically controlled as a function of the difference between the phase of the signal delivered by the measuring element and the phase of the signal supplied to the excitation element, whatever the force applied to the free end of the effector beam.

12. Force sensor according to claim 11, in which the automatic control loop comprises a multiplier unit having a first input receiving the signal delivered by the measuring element having optionally undergone a phase shifting and a second input receiving a signal expressing the signal to apply to the excitation element, and an output connected to an input of a low pass filter unit, the low pass filter unit having an output which is on the one hand the output intended to supply a signal expressing the intensity of the force applied to the free end of the effector beam, and which on the other hand is connected to an input of a voltage controlled oscillator unit, the voltage controlled oscillator unit having an output connected on the one hand to the second input of the multiplier unit and on the other hand to the excitation element.

13. Force sensor according to claim 12, in which the automatic control loop moreover comprises an amplifier unit, the output of the voltage controlled oscillator unit being connected to an input of the amplifier unit, the amplifier unit having an output connected to the second input of the multiplier unit and on the other hand to the excitation element.

14. Force sensor according to claim 13, in which the electronic command and processing circuit moreover comprises a voltage divider unit, said voltage divider unit having an input connected to the output of the amplifier unit, and an output connected to the excitation element.

15. Force sensor according to claim 12, in which the electronic command and processing circuit moreover comprises a phase shifter unit having an input connected to the measuring element and an output connected to the first input of the multiplier unit.

16. Force sensor according to claim 15, in which the electronic command and processing circuit moreover comprises an impedance adaptation unit having an input connected to the measuring element and an output connected to the input of the phase shifter unit.

\* \* \* \* \*